United States Patent
Pol et al.

(10) Patent No.: US 10,787,624 B2
(45) Date of Patent: Sep. 29, 2020

(54) SOLID LUBRICANT AND METHOD OF MAKING THE SAME

(71) Applicant: Purdue Research Foundation, West Lafayette, IN (US)

(72) Inventors: Vilas Ganpat Pol, West Lafayette, IN (US); Farshid Sadeghi, West Lafayette, IN (US); Abdullah Alazemi, West Lafayette, IN (US); Arthur D. Dysart, Baldwin, NY (US)

(73) Assignee: Purdue Research Foundation, West Lafayette, IN (US)

( * ) Notice: Subject to any disclaimer, the term of this patent is extended or adjusted under 35 U.S.C. 154(b) by 5 days.

(21) Appl. No.: 16/013,441

(22) Filed: Jun. 20, 2018

(65) Prior Publication Data

US 2018/0371350 A1 Dec. 27, 2018

Related U.S. Application Data

(60) Provisional application No. 62/523,707, filed on Jun. 22, 2017.

(51) Int. Cl.
*C10M 169/04* (2006.01)
*C09D 1/00* (2006.01)
(Continued)

(52) U.S. Cl.
CPC ............. *C10M 169/04* (2013.01); *C09D 1/00* (2013.01); *B05D 1/005* (2013.01); *B05D 5/08* (2013.01);
(Continued)

(58) Field of Classification Search
CPC ............. C10M 103/02; C10M 111/04; C10M 169/04; C10M 2201/041; C10M 2201/062; C10M 2207/021; C10M 2207/023; C10M 2207/08; C10M 2209/082; C10M 2209/1045; C10M 2213/023; C10M 2213/0623; C10N 2010/02; C10N 2010/04; C10N 2010/06; C10N 2010/08; C10N 2010/10; C10N 2010/12; C10N 2030/06; C10N 2050/02; C10N 2050/08; C10N 2070/00; B05D 1/005; B05D 5/08; B05D 2202/15; B05D 2601/20; C09D 1/007; C09D 7/40; C09D 7/61; C09D 7/65
See application file for complete search history.

(56) References Cited

U.S. PATENT DOCUMENTS

2014/0329729 A1* 11/2014 Becker-Willinger ........................
C09D 5/027
508/106
2017/0088792 A1* 3/2017 Kobayakawa ....... C10M 169/04

* cited by examiner

*Primary Examiner* — James C Goloboy
(74) *Attorney, Agent, or Firm* — Purdue Research Foundation

(57) ABSTRACT

A solid-state lubricant composition is disclosed. The solid-lubricant contains graphene, an oxide of a metal, and one or more polymeric binders. A method of making a solid-state lubricant coating on various substrates is disclosed. The method includes the steps of making a homogeneous slurry comprising powder of an oxide of a metal, graphene, and a polymeric binder with organic volatile solvent; coating a substrate with the homogeneous slurry with desired thicknesses; and drying the slurry on the substrate naturally or applying additional heat, resulting in a solid lubricant coating on the substrate. Substrates with coated solid composite lubricant show wear reduction and lower coefficient of friction compared with uncoated substrates.

8 Claims, 20 Drawing Sheets

(51) Int. Cl.
  *C10N 50/02* (2006.01)
  *B05D 1/00* (2006.01)
  *B05D 5/08* (2006.01)
  *C09D 7/40* (2018.01)
  *C09D 7/61* (2018.01)
  *C09D 7/65* (2018.01)
  *C10N 10/02* (2006.01)
  *C10N 10/04* (2006.01)
  *C10N 10/06* (2006.01)
  *C10N 10/08* (2006.01)
  *C10N 10/10* (2006.01)
  *C10N 10/12* (2006.01)
  *C10N 30/06* (2006.01)
  *C10N 50/08* (2006.01)
  *C10N 70/00* (2006.01)

(52) U.S. Cl.
  CPC ...... *B05D 2202/15* (2013.01); *B05D 2601/20* (2013.01); *C09D 7/40* (2018.01); *C09D 7/61* (2018.01); *C09D 7/65* (2018.01); *C10M 2201/041* (2013.01); *C10M 2201/062* (2013.01); *C10M 2207/021* (2013.01); *C10M 2207/023* (2013.01); *C10M 2207/08* (2013.01); *C10M 2209/0625* (2013.01); *C10M 2209/082* (2013.01); *C10M 2209/1045* (2013.01); *C10M 2213/023* (2013.01); *C10M 2213/0623* (2013.01); *C10N 2010/02* (2013.01); *C10N 2010/04* (2013.01); *C10N 2010/06* (2013.01); *C10N 2010/08* (2013.01); *C10N 2010/10* (2013.01); *C10N 2010/12* (2013.01); *C10N 2030/06* (2013.01); *C10N 2050/02* (2013.01); *C10N 2050/08* (2013.01); *C10N 2070/00* (2013.01)

SOLID LUBRICANT AND METHOD OF MAKING THE SAME

CROSS-REFERENCE TO RELATED APPLICATIONS

The present patent application is related to and claims the priority benefit of U.S. Provisional Patent Application Ser. No. 62/523,707 filed Jun. 22, 2017, the contents of which are hereby incorporated by reference in their entirety into the present disclosure.

TECHNICAL FIELD

This disclosure relates to dry solid lubricants, especially composite lubricants containing graphene, and methods of making them.

BACKGROUND

This section introduces aspects that may help facilitate a better understanding of the disclosure. Accordingly, these statements are to be read in this light and are not to be understood as admissions about what is or is not prior art.

Mechanical systems with greater energy efficiency and lower environment impact require enhanced performance at moving interfaces. The fundamental causes of mechanical failure are friction and wear: reducing these energy losses improves performance and lifetime of many mechanical systems. Conventional methods to improve energy efficiency utilize liquid lubricants, including organic oils, to reduce friction between contacting surfaces in relative motion. Furthermore, the addition of nanoparticles to lubricating oils has been shown to further enhance tribological performance. However, despite their convenience and utility, liquid lubricants cannot be used in situations of high temperature or low pressure (viz., vacuum), due to the risk of volatilization and fire. In this context, dry solid-state lubricants are a viable alternative to their liquid counterparts in extreme operating environments.

Graphene, due to its distinct material properties, is a promising candidate for solid-state lubrication. Graphene is a unique carbon allotrope, comprising a flat lattice of aromatic carbon rings only one atom thick. This two-dimensional arrangement enables superior thermal conductivity, extreme mechanical strength, and ultralow friction. In particular, the low coefficient of friction for graphene materials has been demonstrated at the nanoscale by atomic force microscopy. These uncommon properties, combined with continuous production processing, distinguish graphene from other nanomaterials for friction and wear reduction. However, existing tribological studies of graphene at the microscale and macroscale show that friction and wear reductions only occur under low contact pressures: friction and wear rapidly increase under high contact pressure (i.e., >0.5 GPa). The failure of bare graphene is attributed to poor adhesion with substrate surface, enabling graphene ejection under excessive pressure. Therefore, durable adhesion between the lubricant film and contact surfaces is critical for application of graphene as a solid lubricant.

Thus, there exists an unmet need for solid lubricants containing graphene which are capable of excellent adhesion to contact surfaces.

SUMMARY

A solid-state lubricant composition is disclosed. The solid-lubricant contains graphene, an oxide of a metal, and a polymeric binder.

A method of making a solid-state lubricant coating on a substrate is disclosed. The method includes the steps of making a homogeneous slurry comprising powder of an oxide of a metal, graphene, a polymeric binder an organic volatile solvent; coating a substrate with the homogeneous slurry; and drying the slurry on the substrate, resulting in a solid lubricant coating on the substrate.

BRIEF DESCRIPTION OF DRAWINGS

Some of the figures shown herein may include dimensions. Further, some of the figures shown herein may have been created from scaled drawings or from photographs that are scalable. It is understood that such dimensions, or the relative scaling within a figure are by way of example, and not to be construed as limiting.

DETAILED DESCRIPTION

Figures 1A, 1B:
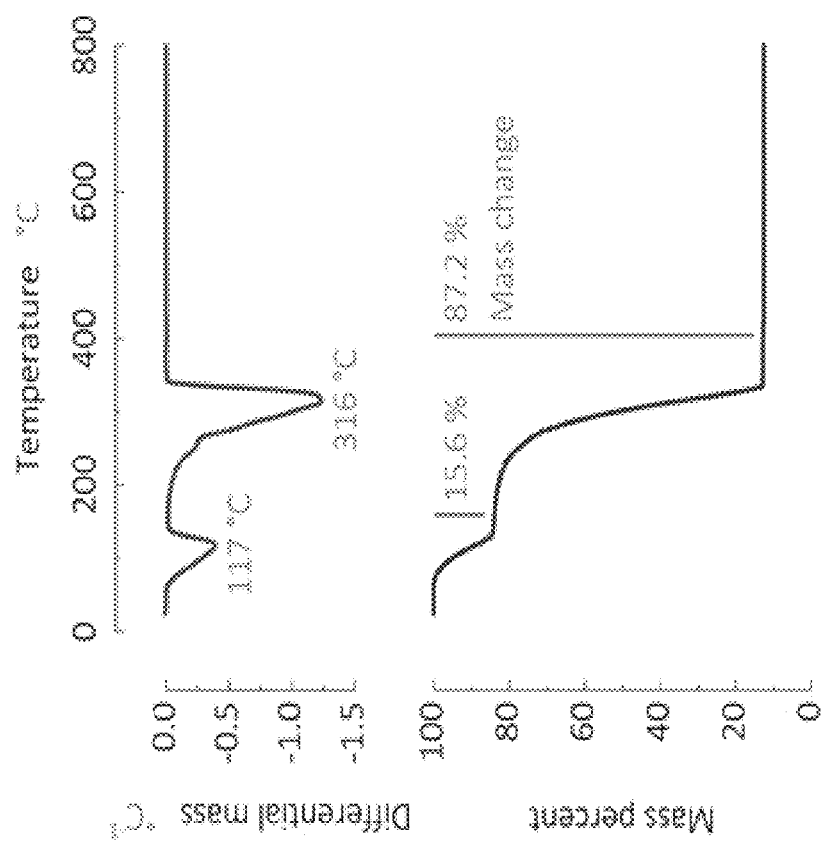
FIGS. 1A and 1B depict thermogravimetric analysis of zinc acetate showing initial mass losses and greatest mass loss respectively.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

In this disclosure, a graphene-rich composite is studied as a solid lubricant to minimize friction and wear losses under high contact pressures and long sliding distances. One example of the composite of this disclosure comprises graphene, zinc oxide, and polyvinylidene difluoride binder. In this disclosure, such composites are termed "composite coating" or "composite lubricant" interchangeably. In this disclosure the word "composite" or the phrases "composite coating" or "composite lubricant" or "composite film" or "composite lubricant film" are used to signify that there is at least one other ingredient other than graphene in the lubricant. Further, in this disclosure, the terms "solid lubricant", "solid state lubricant" and "solid-state lubricant" are used interchangeably. In some instances, the phrase "dry solid lubricant" is used to indicate the solid lubricant. Thus dry solid lubricant and solid lubricant and dry lubricant are also used interchangeably in this description. Thus the solid lubricants of this disclosure are composite lubricants or composite coatings. In experiments leading to this disclosure spin coating was employed to apply the graphene-based composite as an approximately 10 µm thick film onto a stainless steel surface. Tribological performance was measured in the ball-on-disk configuration under ambient conditions. It was found that the composite film significantly improves friction and wear reduction (approximately 90%) relative to unlubricated contact. Following tribological testing, Raman spectroscopic analysis of produced wear tracks revealed a persistent protective film on both contact surfaces. It is theorized that zinc oxide enables durable binding of graphene to the contact surfaces, enabling friction and wear reduction under the unusual conditions of high contact pressure inside the contact area. It should be noted that those skilled in the art will recognize the nomenclature used in this description both for the test parameters (such as sliding distance and stationary specimen or sample) and the vocabulary used in reporting of the results.

Primarily, the lubricant is made in a liquid slurry form comprising all ingredients of the composite, which converts into dry form after laminating on mechanical parts followed by evaporating organic solvent. The applied dry lubricant can be cured (heat treatment at less than 150 Degree Celsius) to enhance the adhesion properties. Finally, it remains as a solid material on the applied mechanical flat (two dimensional) or one dimensional or 3 dimensional surfaces termed as solid or dry (without solvent) lubricant. The initial liquid slurry can be sprayed as an aerosol, spin coated or laminated applying doctor blade method on the mechanical surfaces to develop a solid lubricant.

Formation of Graphene-Based Composite: The composite film of this disclosure comprises graphene, zinc oxide, and polyvinylidene fluoride (PVDF). It is believed that the primary lubrication effects are due to graphene, while synergistic adhesion is due to zinc oxide and PVDF. Specifically, zinc oxide provides intraphase adhesion (that is, between the composite coating and the substrate surface) while PVDF provides interphase adhesion (within the composite coating). Characterization of this system has been performed to understand the chemical and material properties of the film relative to its constituents.

In this detailed description the material properties, characterization of the materials and tribological testing results of the solid lubricant of this disclosure are presented first. In the later sections, the method of making the solid lubricant, the characterization methods employed for the ingredient materials and the composite and the tribological testing procedures are detailed.

In experiments leading to this disclosure, Zinc oxide was synthesized from zinc acetate dihydrate by thermal decomposition. Thermogravimetric analysis indicated that the macroscale mechanism is comprised of two independent steps as shown in FIGS. 1A and 1B. FIG. 1A depicts the first step of thermogravimetric analysis of zinc acetate showing that the first mass loss of 15.6%-wt. occurs at temperature 117° C. due to vaporization of hygroscopic adsorbed moisture. FIG. 1B depicts thermogravimetric analysis of zinc acetate showing that the second mass loss of 71.6%-wt. occurs at temperature 316° C. due to the thermal decomposition of the acetate anion. The broad, overlapping features of the differential thermogram near 316° C., shown in FIG. 1A suggests this decomposition includes several elementary steps. The overall mass loss of this reaction is 87.2%-wt., producing a product yield of 12.8%-wt.

Figure 2A:
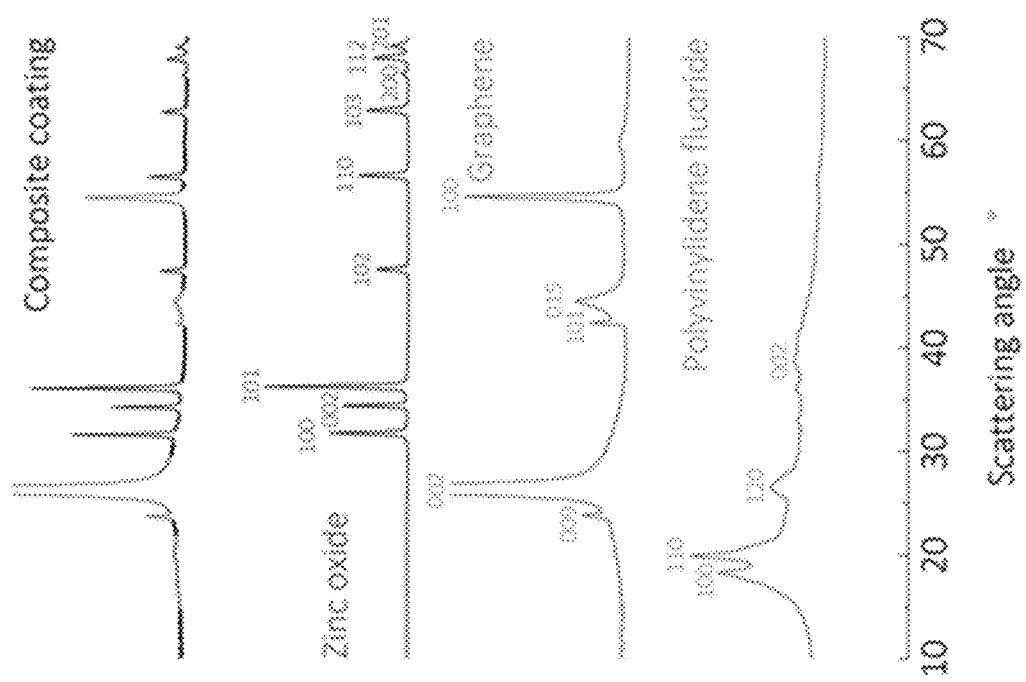
FIG. 2A shows X-ray powder diffraction of the composite coating of this disclosure.

The prepared composite coating is considered a physical mixture of its components. FIG. 2A shows X-ray powder diffraction of the composite coating, showing that preparation of the composite film does not chemically change the identity of the film precursors. Referring to FIG. 2A, the characteristic x-ray spectral features of the dried composite coating are identical to those of its constituent components. Further, X-ray powder diffraction (XRD), shown in FIG. 2A, demonstrated that the crystallographic profile for the composite is a linear combination of the profiles for the components. The synthesized zinc oxide exhibits sharp, spectral features of hexagonal zincite. Graphene exhibits spectral features representing the 002 and 100 facets of hexagonal carbon. The additional features near scattering angles 22, 42 and 44° respectively represent the 009, 101, and 015 facets. These secondary features are characteristic of nitrate functionalization, a common consequence of graphene production through chemical exfoliation. PVDF exhibits diffuse spectral features, indicative of disordered materials, that represent a mixture of the α and β phase. In comparison, the scattering spectrum of the composite is comprised of the principle intensity features of its constituents. The broad, shallow, and irregular baseline that occurs between 12°-42° is due to the low intensity of PVDF relative to the more crystalline components. The intense features that occur near 23, 44, and 50° correspond to the high crystallinity of graphene. The remaining spectral features correspond to the crystal facets of zinc oxide. The spectral features of the composite X-ray spectrum are a direct consequence of the discrete nature of the composite film.

Figure 2B:
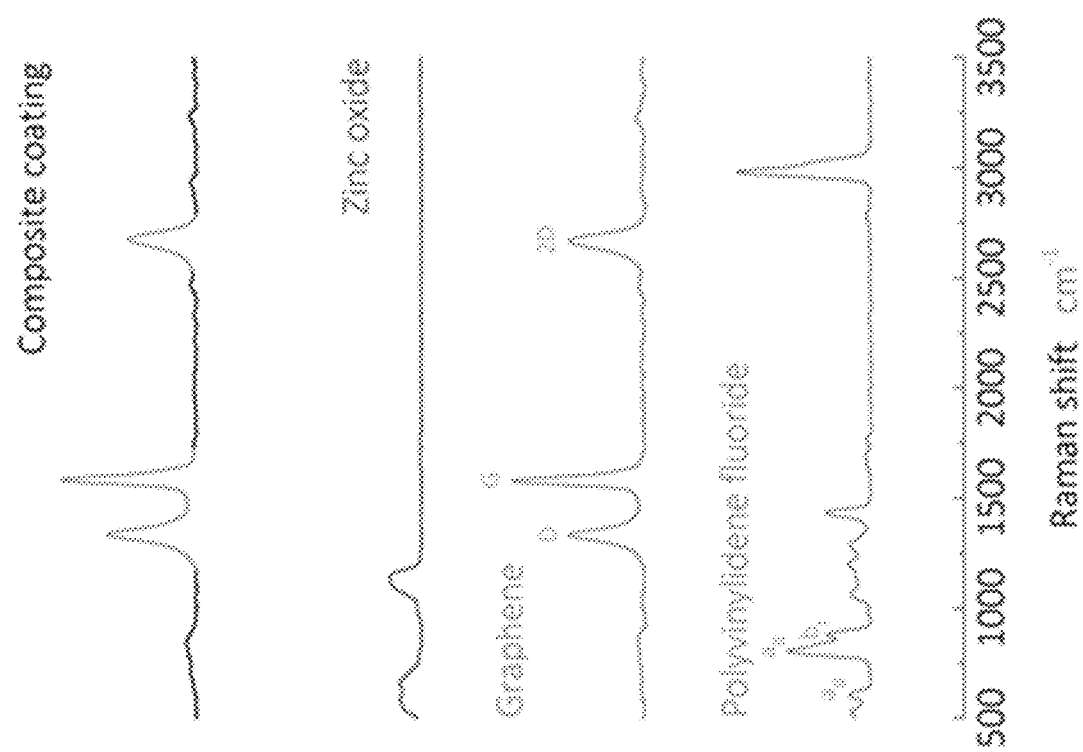
FIG. 2B shows Raman spectroscopy of the composite coating of this disclosure.

FIG. 2B shows Raman spectroscopy of the composite coating of this disclosure. Referring to FIG. 2B, the Raman spectral features of the dried composite coating only match those of graphene, which demonstrates an overwhelming Raman excitation response. Raman spectroscopy also shows that the binding of carbon within graphene remains unchanged from the film preparation process, as shown in FIG. 2B. Graphene exhibits intense Raman excitation at frequencies 1332, 1577, and 2667 $cm^{-1}$ corresponding to vibrational modes D, G, and 2D, respectively. The areal intensity ratio of the D and G peaks is calculated as 0.942 for graphene and 1.073 for the composite film: high similarity in these values suggest the distribution of $sp^2$ and $sp^3$ hybridization of graphene is conserved in the composite film. It is important to note that the spectral features of PVDF and ZnO are absent in the composite spectrum because these features produce negligible Raman intensity compared to those of graphene. Therefore, the presence of the composite film can be related to intense excitation of the D or G vibrational modes (FIG. 2B).

Figures 3A, 3B, 3C:
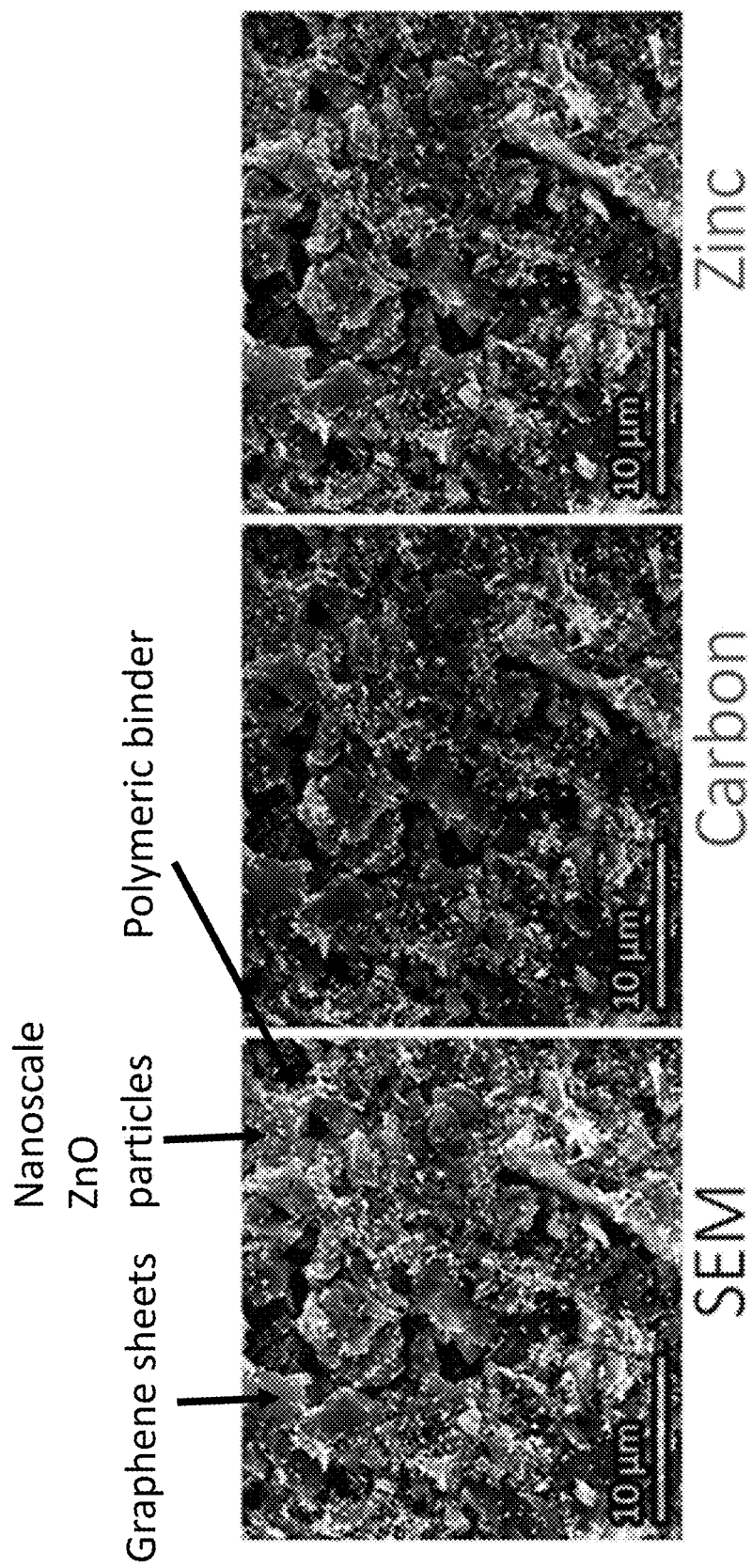
FIG. 3A is a scanning electron micrograph of the composite of this disclosure.
FIGS. 3B and 3C show energy-dispersive spectroscopy of carbon content and zinc content respectively of the composite coating of this disclosure.

FIG. 3A is a scanning electron micrograph of the composite of this disclosure. Referring to FIG. 3A, the composite film contains a uniform distribution of zinc oxide and graphene showing a homogeneous distribution of microscale sheet-like particles and nano-scale aggregates. Scanning electron micrographs have shown that the film is primarily comprised of broad micro-scale graphene particles. FIGS. 3B and 3C show energy-dispersive spectroscopy of carbon content and zinc content respectively of the composite coating of this disclosure. Referring to FIG. 3B element pixel maps from energy dispersive X-ray spectroscopy (EDS) confirm the high carbon content of the planar graphene particles, suggesting that the micro-scale particles are attributed to graphene. Furthermore, in FIG. 3C smaller nano-scale particles are observed across the basal graphene surfaces; these high zinc content particles, shown in FIG. 3C are zinc oxide. Thus, scanning electron micrography and energy-dispersive x-ray spectroscopy of the composite coating demonstarted a homogeneous distribution of zinc within a carbon-rich graphene phase.

From the above characterization, the composite film of this disclosure can be interpreted as a mono-disperse mixture of zinc oxide and PVDF among a random arrangement of graphene. Zinc oxide and PVDF are nano-scale particles, while graphene is a micro-scale particle. Finally, it is observed that the applied preparation techniques do not chemically modify graphene, PVDF, or zinc oxide: rather, each component retains its crystallographic order in the composite following preparation.

Figure 4:
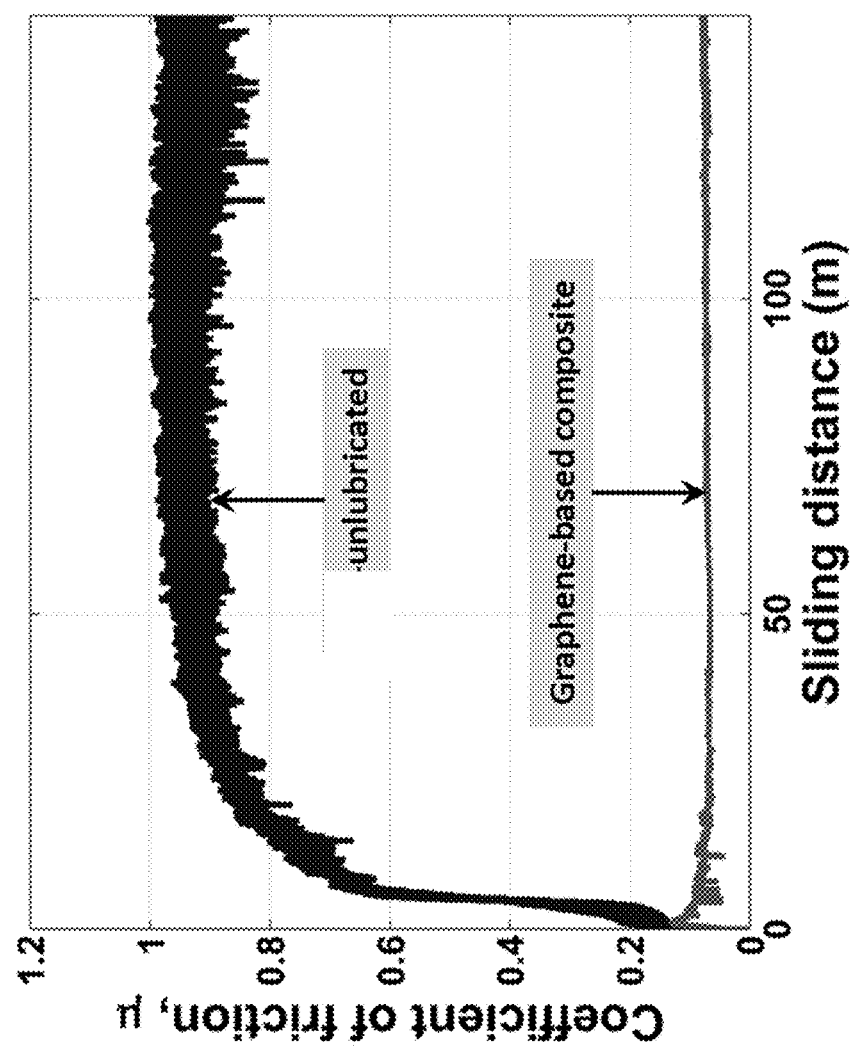
FIG. 4 shows friction reduction resulting from the composite coating of this disclosure.

At the steel-steel point interface, the tribological performance of the graphene-rich lubricant is superior to the performance in unlubricated contact. Under normal load of 10 N (Hertz contact pressure 0.89 GPa) to sliding distance of 145 m, the graphene-based composite demonstrated approximately 90% friction reduction relative to unlubricated contact. This can be seen in FIG. 4 which shows friction reduction resulting from the composite coating of this disclosure. Referring to FIG. 4, unlubricated sliding results in a large coefficient of friction that persists over a long sliding distance. In comparison, lubricated sliding results in a drastically reduced coefficient of friction across the same sliding distance. In FIG. 4 and several other figures where coefficient of friction is reported, the bands (data points) in the graphs represent the scatter or deviation in the data based on the coating thickness deviation, which is the result of collecting numerous data points. Those skilled in the art will readily recognize this.

During unlubricated steel-steel sliding, the coefficient of friction erratically increases from approximately 0.20 to 0.90 after 30 m with unsteady behavior. This irregular behavior is attributed to the generation of wear particles at the sliding surfaces. During graphene-lubricated sliding to 145 m, in contrast, the coefficient of friction reaches a maximum of approximately 0.13 and steadily decreases to stability at 0.08 with stable and steady behavior during the entire tribo-test.

Figure 5:
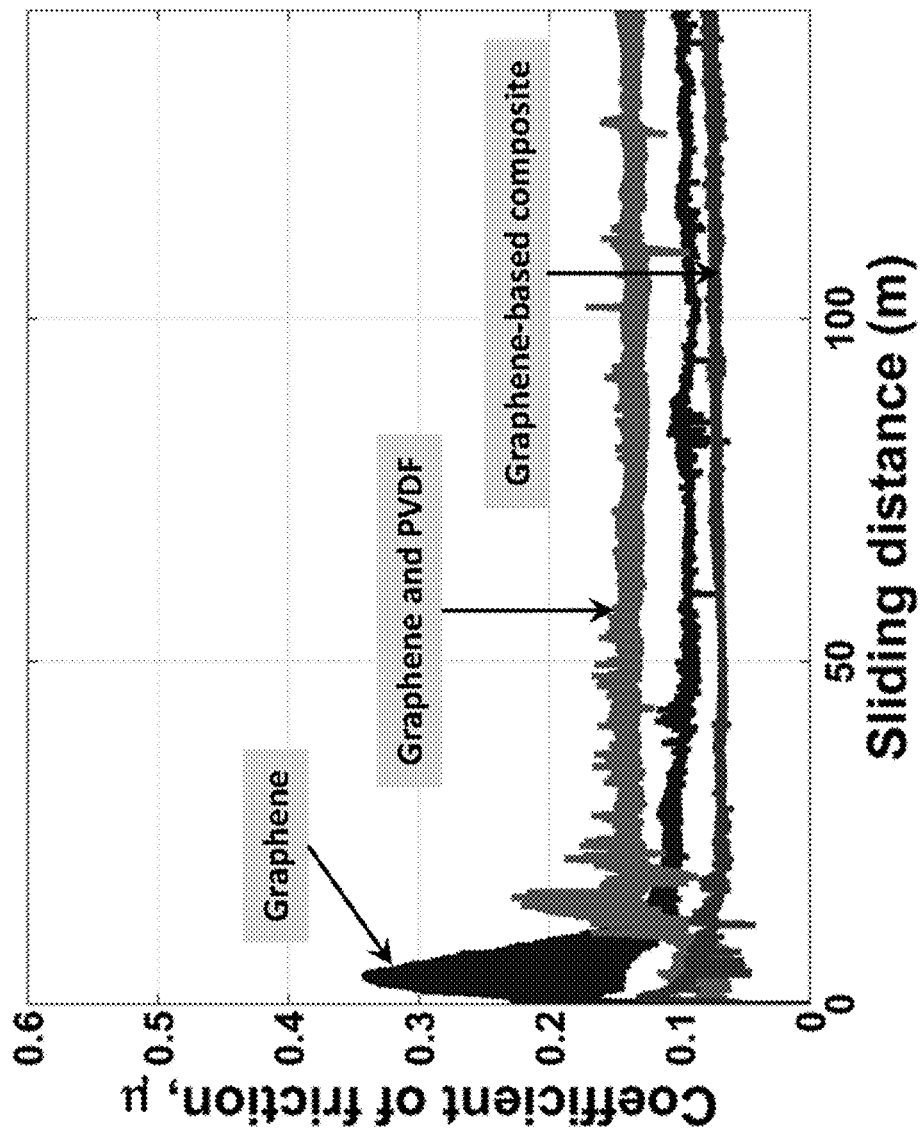
FIG. 5 shows the effect of film composition on friction reduction.

The role of zinc oxide in the graphene-based composite was investigated by testing alternative coating compositions: (I) graphene, zinc oxide, and PVDF binder; (II) graphene and PVDF binder; and (III) graphene only. The graphene only composition measures the native friction reduction of graphene alone, while the graphene/PVDF composition measures friction reduction of graphene in the presence of PVDF. FIG. 5 shows the effect of film composition on friction reduction. While graphene shows exceptional lubrication properties alone, zinc oxide critically reduces the measured friction in the composite coating. Zinc oxide also mitigates the increased friction resulting from the addition of PVDF to graphene. Referring to FIG. 5, under applied normal load of 10 N to 145 m sliding distance, the graphene/PVDF/ZnO composite demonstrates the greatest friction reduction. The equilibrium coefficients of friction were measured as 0.08 for the total composite, 0.14 for graphene and PVDF, and 0.10 for graphene only. The friction coefficient for the graphene/PVDF composite is greater than that of graphene alone, which could be due to the additional friction from the rough polymer. In comparison, the friction coefficient for the graphene/PVDF/ZnO composite is less than that of graphene alone, suggesting that zinc oxide simultaneously enhances the native friction reduction of graphene and mitigates friction introduced by PVDF.

Figure 6:
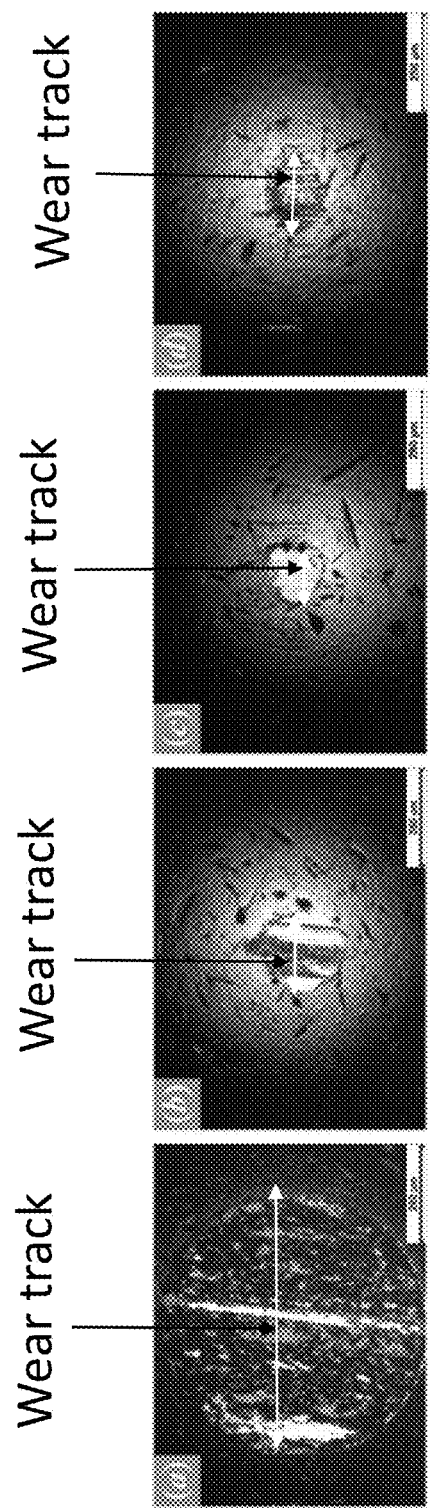
FIG. 6 shows optical micrographs of wear tracks are dependent on the composition of the lubricant used.

FIG. 6 shows optical micrographs of composition-dependent wear tracks on the moving rotating disc specimen in the tribology testing. The nomenclature used in this spoecification with reference to tribology testing (e.g. stationary specimen) is well known to those skilled in the art. These micrographs show that dry lubricants improve the wear resistance, and that the presence of zinc oxide prevents formation of an appreciable track. Micrographs a and e show that unlubricated sliding produces a deep, rough wear track. Micrographs b and f show that lubricated sliding with graphene produces a smaller, smoother wear track. Micrographs c and g show that lubricated sliding with graphene and PVDF produces an even smaller, smoother wear track. Micrographs d and h show that the composite coating containing graphene, PDVF, and zinc oxide prevents formation of an appreciable wear track, generally preserving the specimen surface. Thus, the composite coatings of this disclosure containing zinc oxide help binding graphene to the mechanical surfaces such as stainless steel via covalent or van der Waals bonds making stronger adhesion (tribofilm) yielding low friction and wear. Without ZnO the adhesion is weak and tribological properties are poor.

In addition to reducing friction, the composite coating reduces both wear track formation and surface roughening. After testing with normal load 10 N to sliding distance of 145 m, optical micrographs and 3D surface scans of the ball specimen illustrate that the wear track decreases with the addition of components to the composite coating as shown in FIG. 6. After unlubricated sliding, the formed wear track has diameter 656 μm and roughness $R_a$ 540 nm. After lubricated sliding with graphene only, the wear track diameter and roughness are reduced to 221 μm and 87 nm, respectively. After lubricated sliding with graphene and PVDF, the wear track diameter and roughness are further reduced to 158 μm and 72 nm, respectively. In this case, enhanced wear reduction is attributed to the increased coating strength from PVDF. Finally, after lubricated sliding with graphene, zinc oxide, and PVDF, an appreciable wear track was not formed: the specimen surface demonstrates only a few discernable scratches. In fact, a dark opaque film is observed in place of a wear track as shown in micrograph designated as "d" in FIG. 6. It is expected that this residual coating enhances friction and wear reduction by preventing direct contact to the sliding disk surface.

The composition of the coating of this disclosure significantly improves tribological performance. Compared to unlubricated steel-steel sliding, lubricated sliding with graphene alone results in drastic friction reduction to 10 N load and 145 m sliding distance tribo-test. The addition of PVDF to the film also reduces wear and friction compared to unlubricated sliding, however, friction reduction is greater than that of graphene alone. The addition of zinc oxide to the composite film reduces friction below that measured in either lubricant compositions. These findings suggest the importance of zinc oxide to the composition of this adhesive composite.

Figure 7:
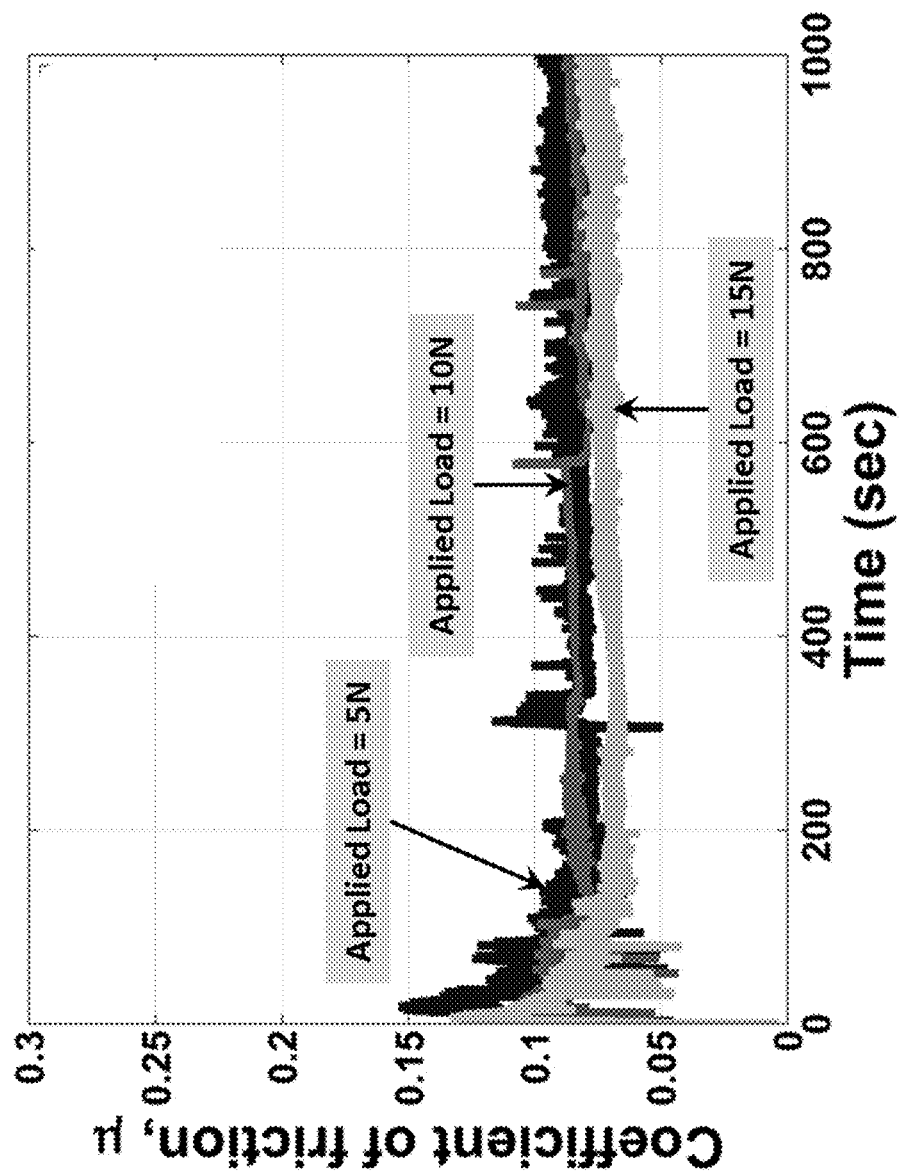
FIG. 7 shows effect of applied load on friction reduction. The steady state coefficient of friction for the composite coating is constant under an applied load up to 15 N.

To quantify durability of the composite coating, the coefficient of friction was measured under normal loads 5, 10, and 15 N, corresponding to Hertz contact pressures of 0.71, 0.89, and 1.02 GPa, respectively. FIG. 7 shows effect of applied load on friction reduction. Referring to FIG. 7, the steady state coefficient of friction for the composite coating is constant under an applied load up to 15 N. After extended time in ball-on-disk sliding, the coefficient of friction of the composite coating remains constant. In all trials, the steady state coefficient of friction is initially 0.15, then decreases to 0.09 at approximately 200 s. This value is maintained from approximately 200 s to the conclusion of the test. The consistent lubricating ability of the composite coating is attributed to two factors: the native mechanical strength of graphene, with Young modulus of 1 TPa and intrinsic stress strength of 130 GPa; and the strong adhesive effects of zinc oxide and PVDF. The high-bearing load of the composite coating validates its potential application for high pressure loads.

Figure 8:
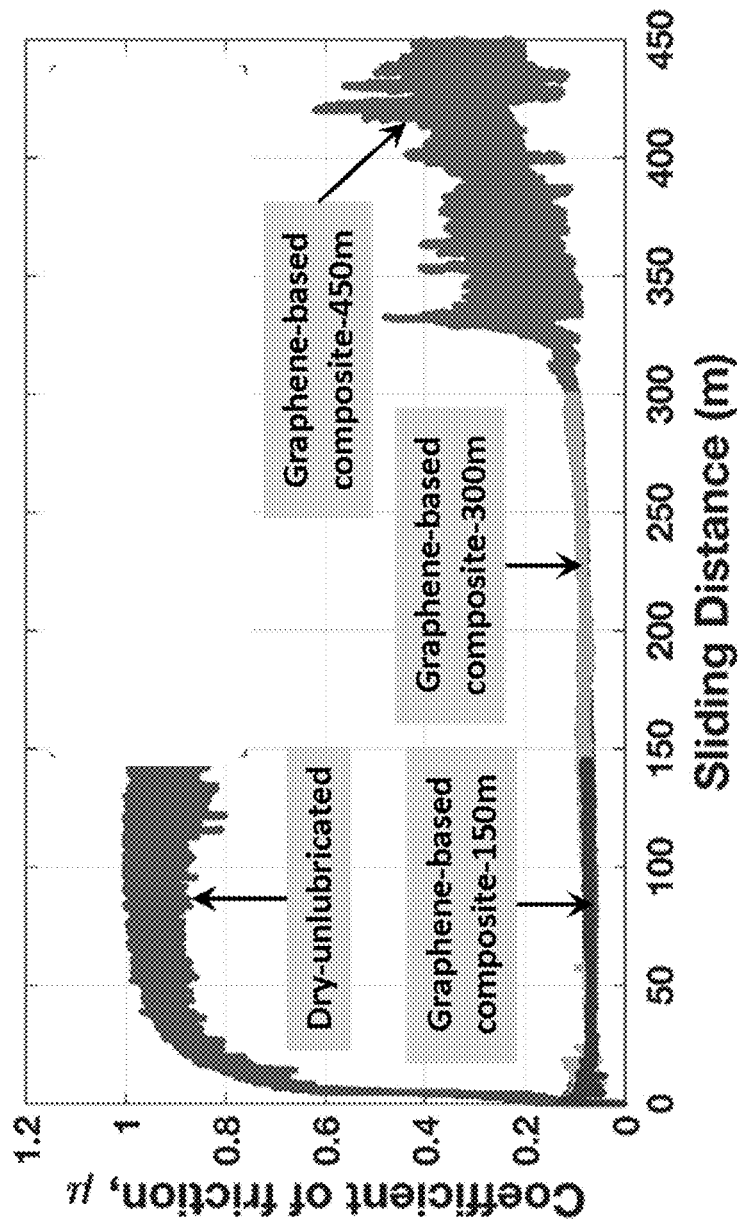
FIG. 8 shows effect of sliding distance on friction reduction for the composite coating of this disclosure.

To quantify endurance of the composite coating under high load, the coefficient of friction was measured to sliding distances of 145, 300, and 450 m under normal load 10 N. FIG. 8 shows effect of sliding distance on friction reduction. In FIG. 8, X-axis numbers indicate the maximum sliding distance in meters that particular measurement was ran and the tribocoating survived. During unlubricated steel-steel sliding, the coefficient of friction rapidly increases to 0.9 after approximately 25 s, then remains constant with unsteady behavior to a sliding distance of 150 m. During lubricated sliding, the coefficient of friction increases to a maximum of only 0.17, then remains at 0.1 to long sliding distances 150 and 300 m. At a sliding distance 450 m, friction coefficient of the composite coating increases from 0.1 to 0.4 with poor stability. This is attributed to generation of wear particles at the sliding surfaces after natural degradation of the coating. However, even after a long sliding distance of 450 m under 10 N load (Hertz contact pressure 0.89 GPa), the frictional losses using the composite coating is still 50% less than that of the dry unlubricated configuration. While friction reduction is maintained to a maximum service distance of at least 450 m, a critical distance of approximately 300 m defines a significant departure in the lubrication ability at the interface of the sliding surfaces.

Figure 9:
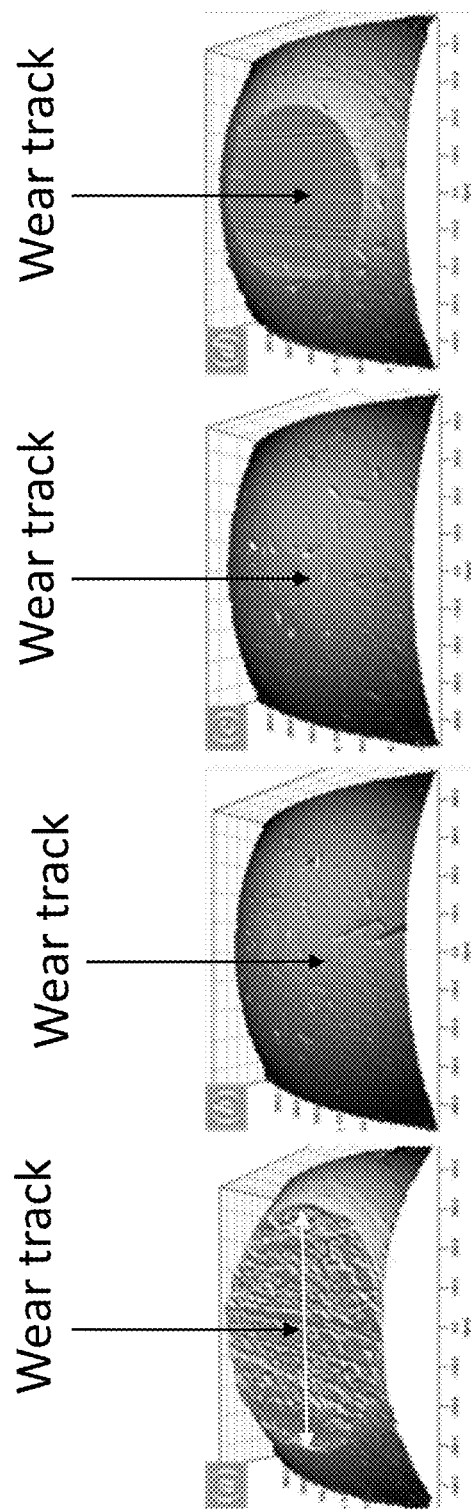
FIG. 9 shows 3D surface reconstruction of sliding distance-dependent wear tracks of the moving (rotating) specimens in the tribology testing.

In addition to reducing friction coefficient, the composite film of this disclosure decreases both wear track formation and surface roughening. After testing with normal load 10 N, optical micrographs and 3D surface scans of the ball specimen indicate a change in lubrication effects after a critical distance of 300 m as shown in FIG. 9. FIG. 9 shows 3D surface reconstruction of sliding distance-dependent wear tracks on the moving specimens, done by computational geometry algorithm used to recreating a surface from scattered data points. On the stationary specimens, lubricated sliding enables wear protection up to approximately 300 m but continues to prevent excessive roughness. Referring to FIG. 9, unlubricated sliding to 145 m produces a deep, rough track as seen in micrograph labeled "a"; lubricated sliding up to 145 m does not show formation of an appreciable wear track as seen in micrograph labeled "b"; lubricated sliding to 300 m produces a developing, smooth wear track as seen in micrograph labeled "c"; and lubricated sliding to 450 produces a shallow, smooth wear track on the contact surface as seen in micrograph labeled "d". After unlubricated sliding to 145 m, the formed wear track has diameter 656 μm and roughness 540 nm. After lubricated sliding to 145 m, the contact surface does not form an appreciable wear track; this result is consistent to previous wear observations. After lubricated sliding to 300 m, the contact surface begins to develop slight wear with diameter 135 and roughness 50 nm. After lubricated sliding to 450 m, an appreciable track is observed with diameter 494 μm and roughness 56 nm. Interestingly, the wear track developed after lubricated sliding to 450 m is 25% smaller but 90% smoother than that developed after unlubricated sliding. The perseverance of a smooth surface after 300 m to 450 m further evidences a persistence of graphene around the wear track even after sliding distance 300 m.

Figure 10:
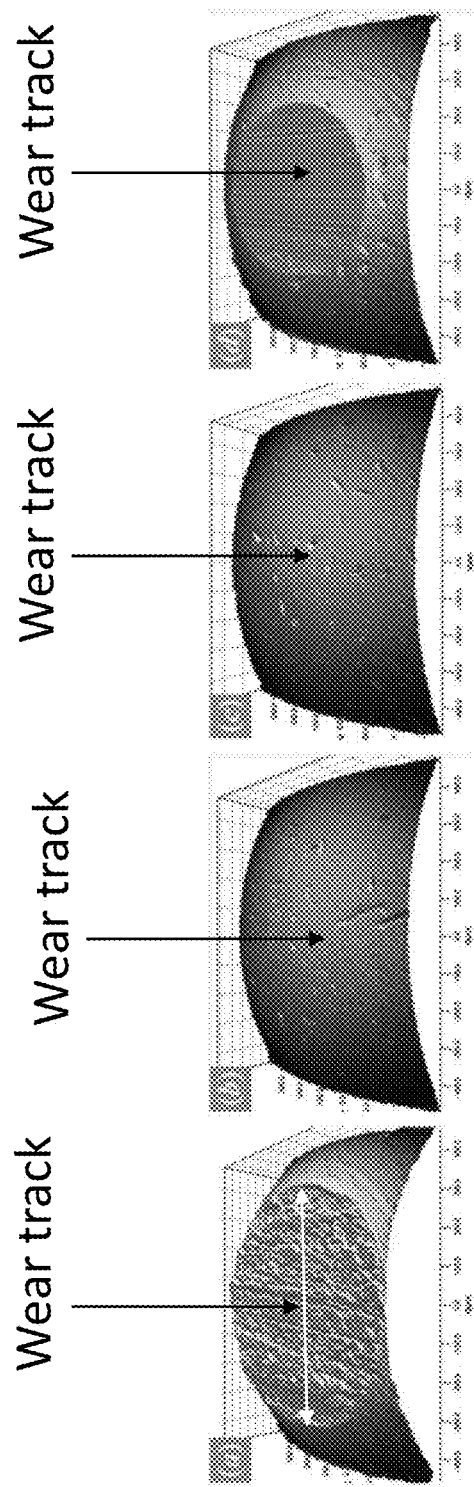
FIG. 10 shows 3D surface reconstructions of composition-dependent wear tracks on the rotating specimens in tribology testing.

Sliding distance, to a critical value, has a significant influence on friction reduction and wear track formation on the stationary ball specimen. However, with graphene-based composite lubricant, sliding distance does not influence formation of the wear features on the rotating disk specimen. FIG. 10 shows 3D surface reconstructions (as mentioned above) of sliding distance-dependent wear track on tracks in on the rotating specimens. In FIG. 10, micrograph labeled "a" shows unlubricated sliding up to 150 m produces a deep, rough track. In contrast, micrographs labeled "b", "c' and "d" corresponding to lubricated sliding up to 150 m, 300 m, and 450 m respectively do not show formation of an appreciable wear track. Referring to FIG. 10, after testing with normal load 10 N, optical micrographs and 3D surface reconstructions of the rotating disk specimen show no appreciable wear track after 450 m in lubricated sliding. After unlubricated sliding to 145 m sliding distance, a wear track with 0.4 μm in depth and about 650 μm in width was formed on the disk specimen. After lubricated sliding to 145 m sliding distance, the contact surface does not form an appreciable wear track. This observation is consistent for lubricated sliding to 300 m and 450 m. In all surface reconstructions for lubricated sliding, the intense contour features adjacent to either side of the wear track are due to solid particles produced from the graphene-based composite film.

Figure 11A:
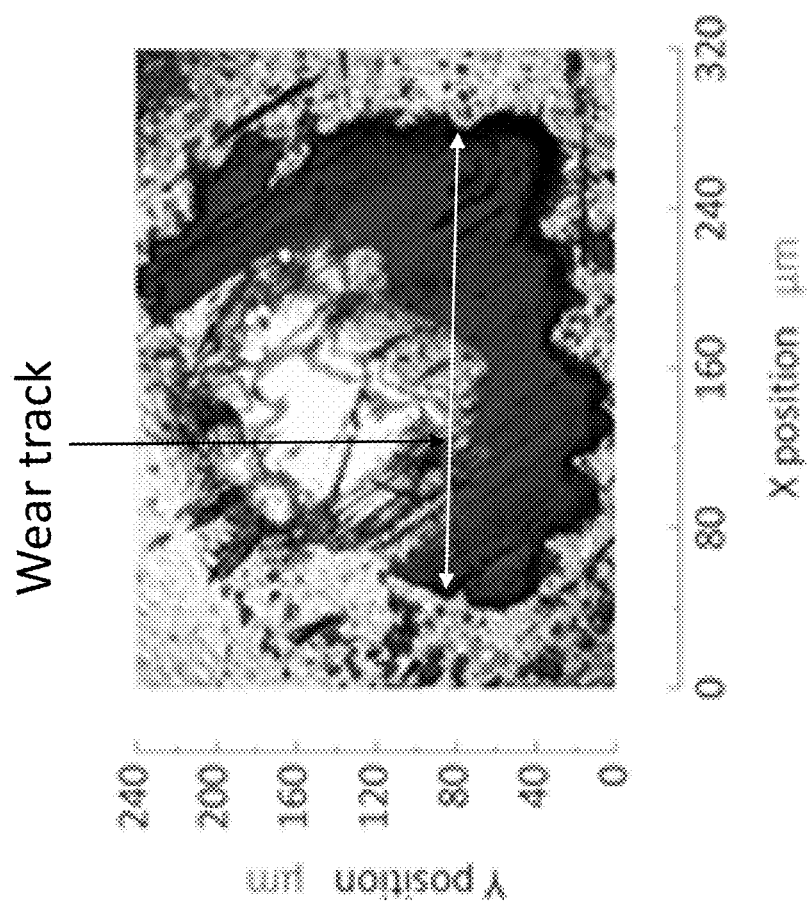
FIGS. 11A through 11D show Raman spectral maps of stationary surface specimen.
Figure 11B:
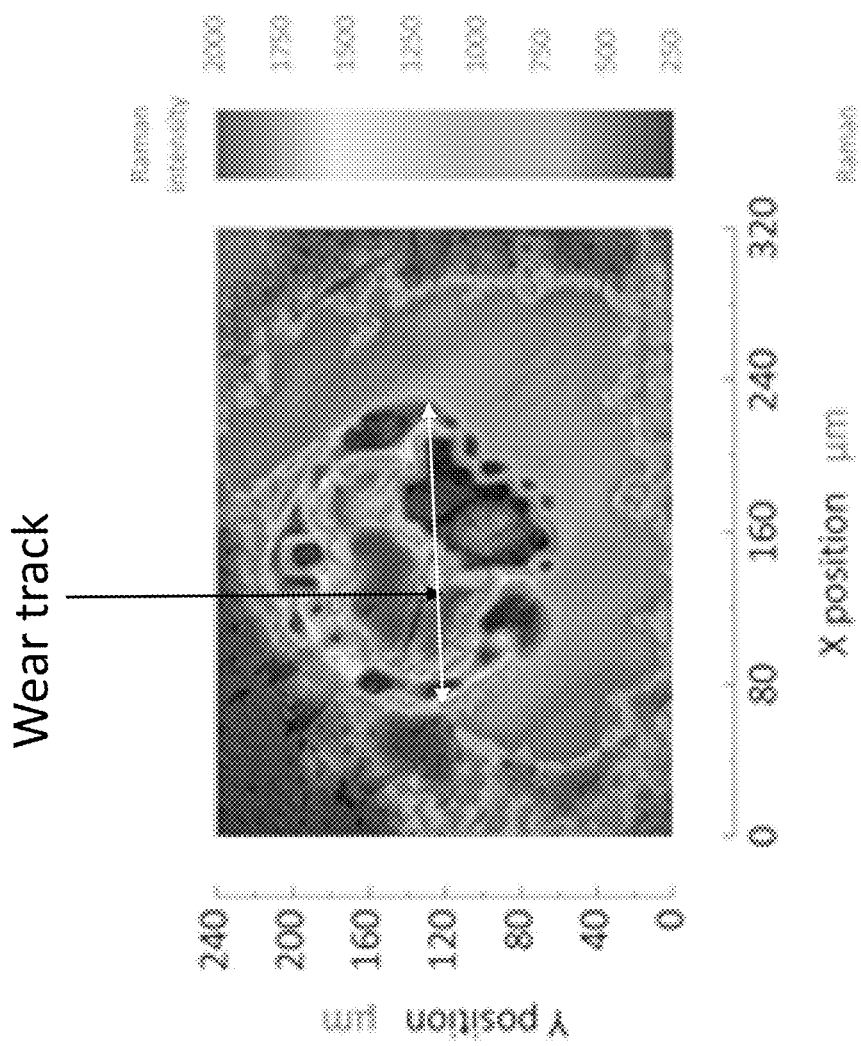
Figure 11C:
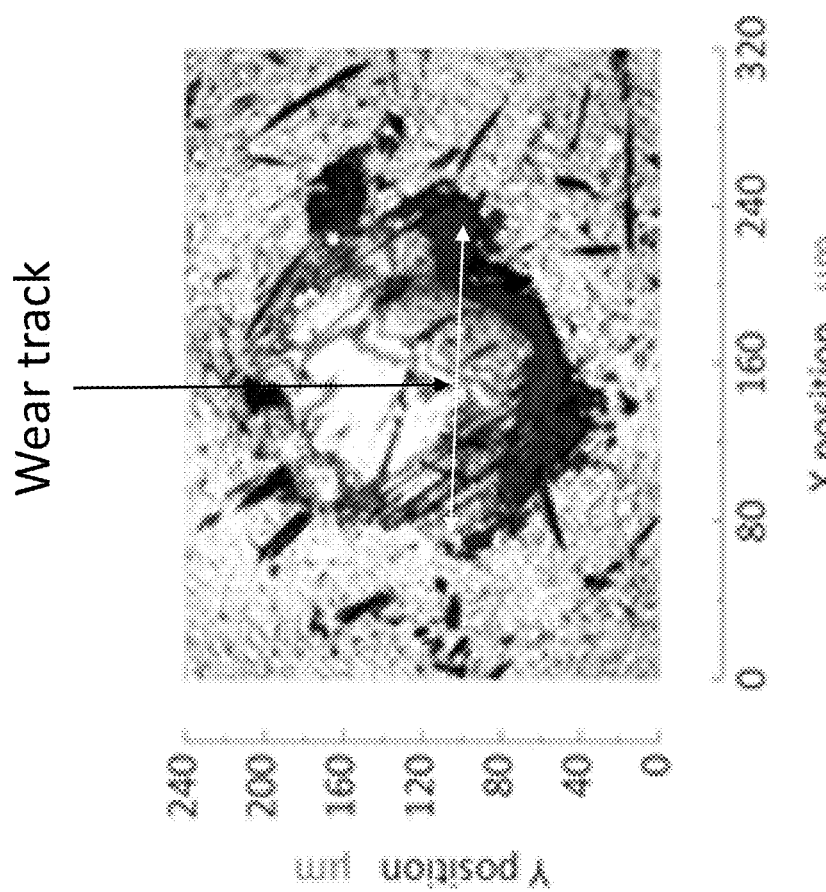
Figure 11D:
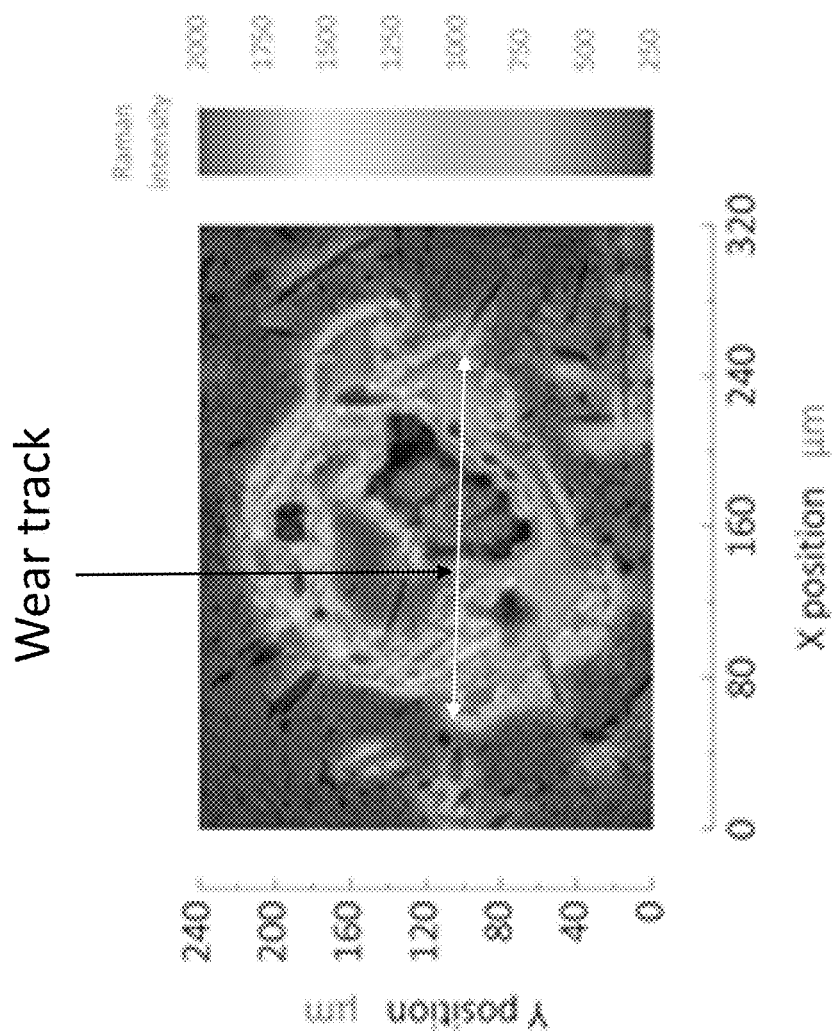

The high graphene content of the wear track on the stationary ball specimen suggests the mechanical and chemical durability of the composite lubricant. The wear track was formed after application of normal load 10 N to sliding distance 145 m. Identified using Raman spectroscopy, the remaining composite film is tracked by the intense vibration mode of graphene at frequency 1580 $cm^{-1}$. FIGS. 11A through 11D shows Raman spectral maps of stationary surface specimen. FIGS. 11A and 11B show that the intense carbon signal following tribology testing correlates to the visible graphene coating that remains on the surface of the ball specimen. FIGS. 11C and 11D show that after removing the visible layer, appreciable carbon signal remains on the surface of the ball specimen. This suggests the importance of a zinc-based binding agent between the carbonaceous graphene and the stainless steel surface. The digital photograph of the wear track after tribology testing shows a dark opaque film covering the specimen surface. Correlation of the spectral color map to the photograph indicates the protective film contains high graphene content. In addition, scratches both within and surrounding the wear track contain high graphene content. It is theorized that this persistent film prevents excessive wear on the ball surfaces during sliding, resulting in friction reduction. After removing the film, the digital photograph of the wear track does not show the dark opaque coating; however, the spectral color map indicates that the edges of the wear track and the surrounding scratches retain high carbon content. The persistence of graphene around the wear track is attributed to the zinc oxide additive: the zinc-containing compound serves as a binding agent between graphene and the stainless steel surface.

Figure 12A:
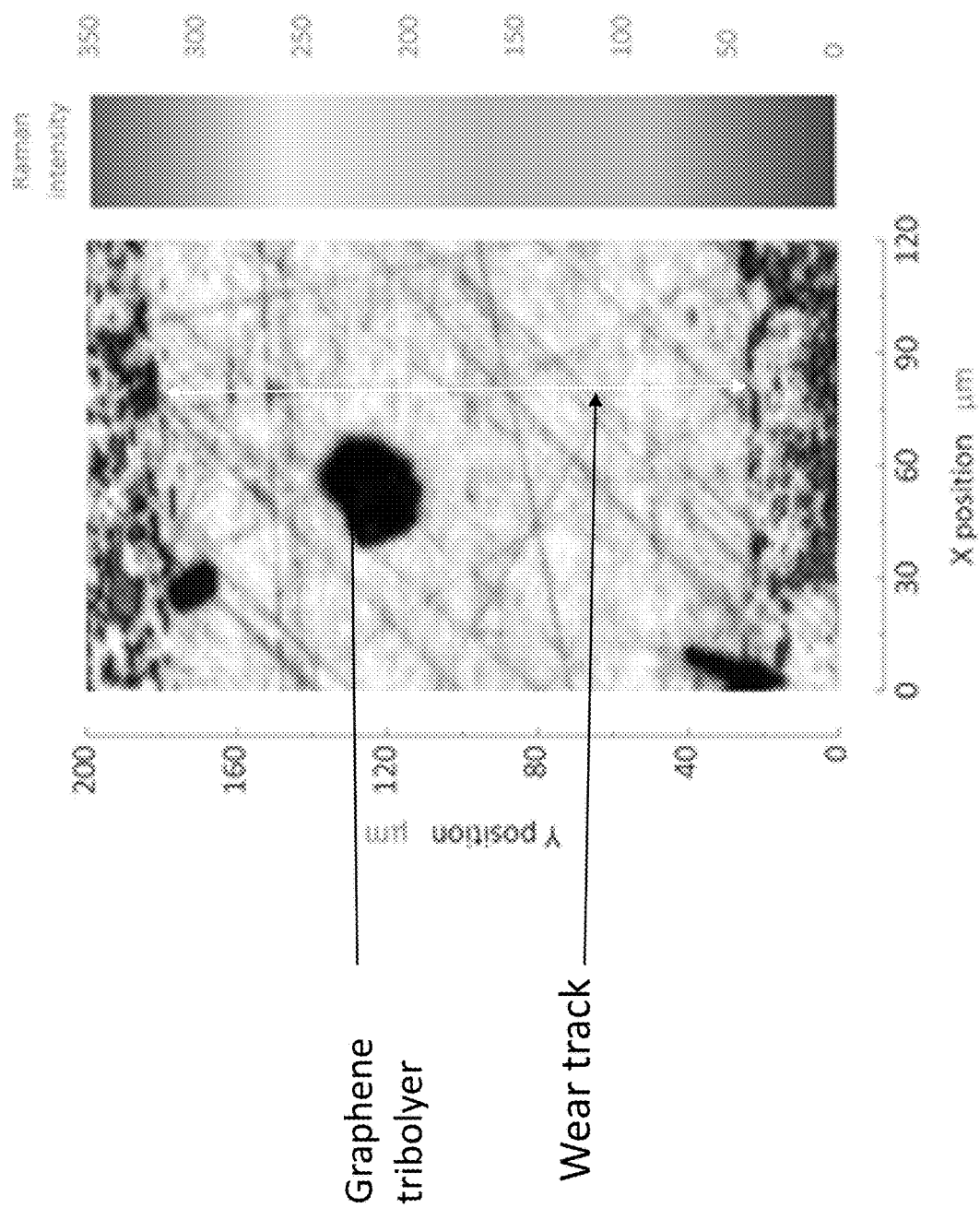
FIGS. 12A and 12B show Raman spectral map of disk substrate surface at two different locations
Figure 12B:
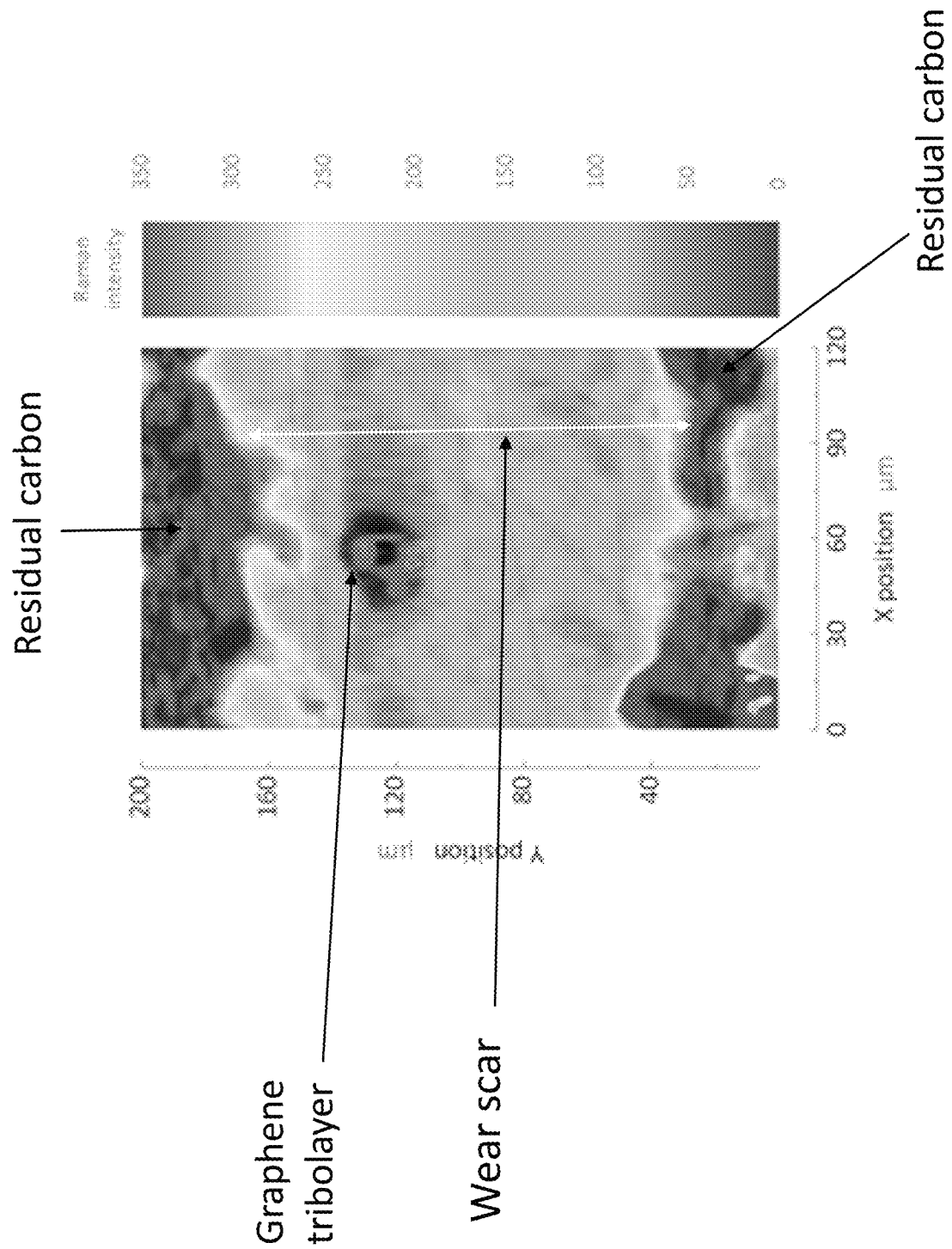

FIGS. 12A and 12B show Raman spectral maps of disk substrate surface at two different locations. Both maps show that following tribology testing, appreciable carbon signal correlates to the scratches that adorn the wear track formed on the rotating specimen. The intense carbon signal on either side of the wear track are due to residual surface particles from the composite coating film. Similarly, the high graphene content of the wear track on the rotating disk specimen evidences the durability of the composite film. The wear track on the disk was formed after application of normal load 10 N to sliding distance 145 m. The digital photograph of the wear track after tribology testing shows a rectangular track populated by linear scratches (machining marks) and black particles (FIGS. 12A and 12B). The edges of the track are adorned by more small black particles; these materials are attributed to the decomposition of the composite film. The spectral map indicates the randomly-oriented scratches on the wear track retain appreciable carbon content after tribology testing. Interestingly, the sliding track remains wholly undamaged: aside from surface scratches, no significant indicators of wear are observed on the disk surface.

Raman spectral mapping of the ball and disk specimens after tribology testing provided evidence that the graphene-rich composite film is retained under extreme operating conditions. Furthermore, the persistence of the film after testing evidences the importance of a zinc-based binding agent between the graphitic carbon and the contact surface.

The graphene-rich composite of this disclosure has proven exceptional performance as a solid-state lubricant under high contact pressure. Tribology testing, under applied loads up to 15 N (Hertz contact pressure 1.02 GPa), demonstrates the composite film retains friction reduction for at least 150 m with stable behavior. Further testing, under constant load and different sliding distances, evidences the significance of zinc oxide to frictionaol.com reduction and wear track preventing or smoothing. Characterization before tribotesting suggests that the produced composite film is a physical mixture of its precursors, with no chemical or crystallographic modification resulting from the preparation process. Spectral mapping after tribotesting confirms the persistence of the composite film on both the rotating and stationary contact surfaces. The durability and resilience of the graphene-based coating prove its great potential as a solid lubricant for dry sliding and high load-bearing applications.

In following sections, the materials and methods used to prepare the composite material solid lubricant of this disclosure, which has been tested producing the results presented above are described.

Synthesis of Zinc Oxide: Zinc oxide powder was prepared by calcination of zinc acetate dihydrate (Sigma Aldrich Corp.). The zinc precursor was loaded into a rectangular aluminum oxide crucible (MTI Corp.) and placed within a horizontal quartz tube furnace (MTI) under continuous compressed air flow at a rate of approximately 100 mL min$^{-1}$. The furnace was heated at uniform temperature rate 10° C. min$^{-1}$ to a dwell temperature of 500° C. for 2 hours. After cooling to room temperature, the product was ground and homogenized using a mortar and pestle. The collected zinc oxide powder was utilized in the following procedures without further processing.

Preparation of Composite Coating: The solid-phase composite lubricant slurry was prepared by ultrasonic homogenization. A viscous mixture of 85.5%-wt. graphene (United Nanotech Innovations PVT Ltd.), 9.5%-wt. zinc oxide, and 5%-wt. polyvinylidene difluoride (PVDF, Sigma-Aldrich) was prepared with solvent N-Methyl-2-pyrrolidone (NMP, Sigma-Aldrich). Homogenization was performed in a sealed borosilicate scintillation vial (Thermo-Fisher Scientific Co.) dispersed using an ultrasonic bath (RPI Corp).

Lamination of the ultrasonically-mixed dispersion onto the contact surface was performed using a spin-coating technique. The homogenized mixture was transferred to the center of the stainless steel disk substrate (Bruker Scientific Co.). Immediately, the loaded disk was accelerated to a constant rotational speed 1000 rev min$^{-1}$ using a tribometer (UMT-3, Bruker Corp.). The disk was rotated at this speed for approximately 2 min. After deceleration to rest, the disk surface was uniformly covered by a black thin film (approximately 10 µm thick). The coated disk was then dried at temperature 80° C. for at least 12 hours to remove the NMP solvent.

Figure 13:
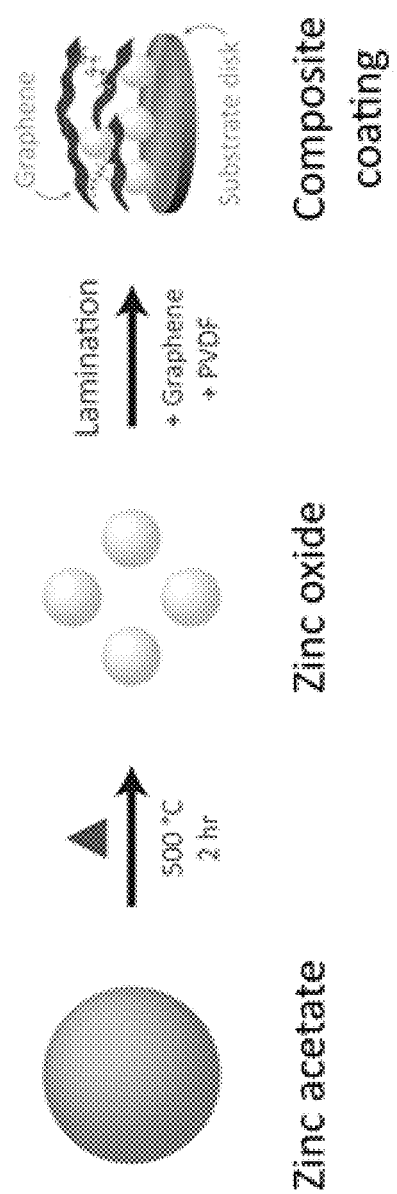
FIG. 13 is a schematic representation of synthesis of zinc oxide, graphene, and binder composite film of this disclosure.

FIG. 13 is a schematic representation of synthesis of zinc oxide, graphene, and binder composite film of this disclosure. Zinc acetate, heated in a continuous air stream, is oxidized to zinc(II) oxide. This product is homogenized with graphene and polyvinylidene fluoride binder using N-Methyl-2-pyrrolidone solvent. The resulting mixture is laminated and dried to produce the solid lubricant film. (Note: the triangle in FIG. 13 denotes heat is being added)

To understand the tribological role of zinc oxide, two reference composite coatings were prepared: (I) graphene and PVDF, and (II) graphene only. The coatings were prepared using modified versions of the above procedure. To produce the graphene and PVDF coating, a viscous mixture of 95%-wt. graphene and 5%-wt. PVDF was prepared with solvent NMP (Sigma-Aldrich) using the ultrasonic dispersion technique previously described. To produce the graphene coating, 100%-wt. graphene was ultrasonically homogenized with solvent NMP. Lamination of the reference composites onto the disk substrate were performed using the spin-coating technique previously described.

X-Ray powder diffraction (XRD) was performed with an X-ray diffractometer (Smartlab III, Rigaku Corp.) with a cross-beam optics system. For powder materials, approximately 2 mg of graphene, zinc oxide, or PVDF were packed into the cavity of borosilicate sample holders (Rigaku) to packing depth approximately 2 mm. For the composite coating, the mixed composite dispersion was dried inside the cavity at temperature 80° C. in vacuo. Loaded sample holders were then mounted into the theta-theta goniometer (Rigaku). Monochromatic Cu-Kα radiation was produced with a 9 kW rotating anode X-ray source, and collected with a sodium iodide scintillation detector (Rigaku). Spectral patterns were produced in the 2θ scattering angle range 2-150° at scanning rate 0.5° min$^{-1}$. Reported spectral patterns are smoothed for clarity of interpretation, but not reduced for background. For diffractograms of materials containing graphene, the intense (002) feature has been truncated to improve visibility of less intense features.

Scanning Electron Microscopy (SEM) was performed using a dual-beam scanning electron microscope (Quanta 3D FEG, FEI Co.). For powder materials, approximately 2 mg of graphene, zinc oxide, or PVDF were adhered to an aluminum sample stage using double-sided carbon tape (3M Corp). For the composite coating, the mixed dispersion was dried on the stage at temperature 80° C. in vacuo. Loaded sample stages were placed inside the microscope chamber and evacuated to high vacuum (i.e., <2.6 nbar). Micrographs were recorded at various magnifications after thorough optimization of electron beam alignment, stigmation, focus, brightness, and contrast. Energy dispersive X-ray spectroscopy (EDXS) was performed using a 80 mm² area silicon drift detector (Oxford Instruments PLC) at energy level 10 keV. Electron pixel maps were produced using the AZTEC analysis software suite (Oxford Instruments).

Thermogravimetric Analysis (TGA) was performed using a simultaneous thermal analyzer (Q600, TA Instruments Inc). Approximately 4 mg zinc acetate dehydrate were loaded into a cylindrical aluminum oxide crucible (TA Instruments). The weight of the crucible was tared prior to sample loading. The loaded crucible was placed inside the horizontal furnace chamber under continuous compressed air flow at rate 100 mL min$^{-1}$. Sample mass was recorded during heating at uniform temperature rate 10° C. min$^{-1}$ to temperature 1000° C. Reported differential thermograms are smoothed for clarity of interpretation.

Raman Spectroscopy was performed using a Raman microscope (DXR, Thermo-Fisher Scientific). The apparatus was calibrated using a polystyrene calibration standard (Thermo-Fisher). For powder materials, approximately 2 mg of graphene, zinc oxide, or PVDF powders were evenly dispersed across a borosilicate microscope slide (Fisher). For the composite coating, the mixed dispersion was dried on the slide at temperature 80° C. in vacuo. The loaded slide was then placed inside the microscope chamber. Spectral patterns were produced using an aperatured green laser with wavelength 532 nm, beam diameter 25 µm, and power 8 mW. A single spectral pattern is the average of at least 3 exposures, with a collection time of 20 seconds per exposure. Reported spectral patterns are smoothed and background-reduced for clarity of interpretation. The areal D-G intensity ratio $R_{D/G}$, a relative measure of sp² and sp³ hybridized carbon, is calculated as the ratio of the area of the D mode spectral peak $A_D$ to the area of the G mode spectral peak $A_G$ Raman spectra were de-convoluted into constituent spectral peaks by fitting each excitation feature to the pseudo-Voigt function.

Following tribology testing, ex situ Raman spectral maps were collected for the ball and disk specimens after sliding contact under applied normal load 10 N to a sliding distance 145 m. The wear track on the ball specimen was characterized both before and after removing the visible surface film from the wear track. The film was removed by gently sweeping a dry fiber cloth across the specimen surface. Each Raman spectral map was produced from at least 169 sampled points represented as a color-scaled cluster map. Each Raman point spectrum was produced with aperatured beam diameter 1.5 µm, and vertical and horizontal step size 2.5 µm. All color maps represent the spectral intensity at excitation frequency 1580 cm$^{-1}$.

Tribological testing was performed at a steel-steel interface using a universal mechanical tribometer (UMT-3, Bruker Corp.). An optical surface profilometer was used to measure the arithmetic average surface roughness $R_a$ of the specimens and wear measurements of the tested specimens. Tribological performance was measured at ambient conditions (i.e., 27° C. and 1 atm) in the ball-on-disk configuration: friction and wear were measured during pure sliding contact between the stationary ball and the rotating disk. The stationary specimen was a stainless steel ball with diameter of 6.3 mm and surface roughness $R_a$ of 60 nm, and the rotating specimen was a stainless steel disk with diameter of 70 mm and surface roughness $R_a$ of 20 nm. Applied normal load was varied from 5-15 N (average Hertz contact pressure 0.71-1.02 GPa) and sliding distance was varied from 150-450 m. Tribology tests were repeated at least three times with error of measured friction and wear below 5%. Prior to testing, all specimens were cleaned with anhydrous acetone (Sigma Aldrich) to remove surface contamination.

Figure 14:
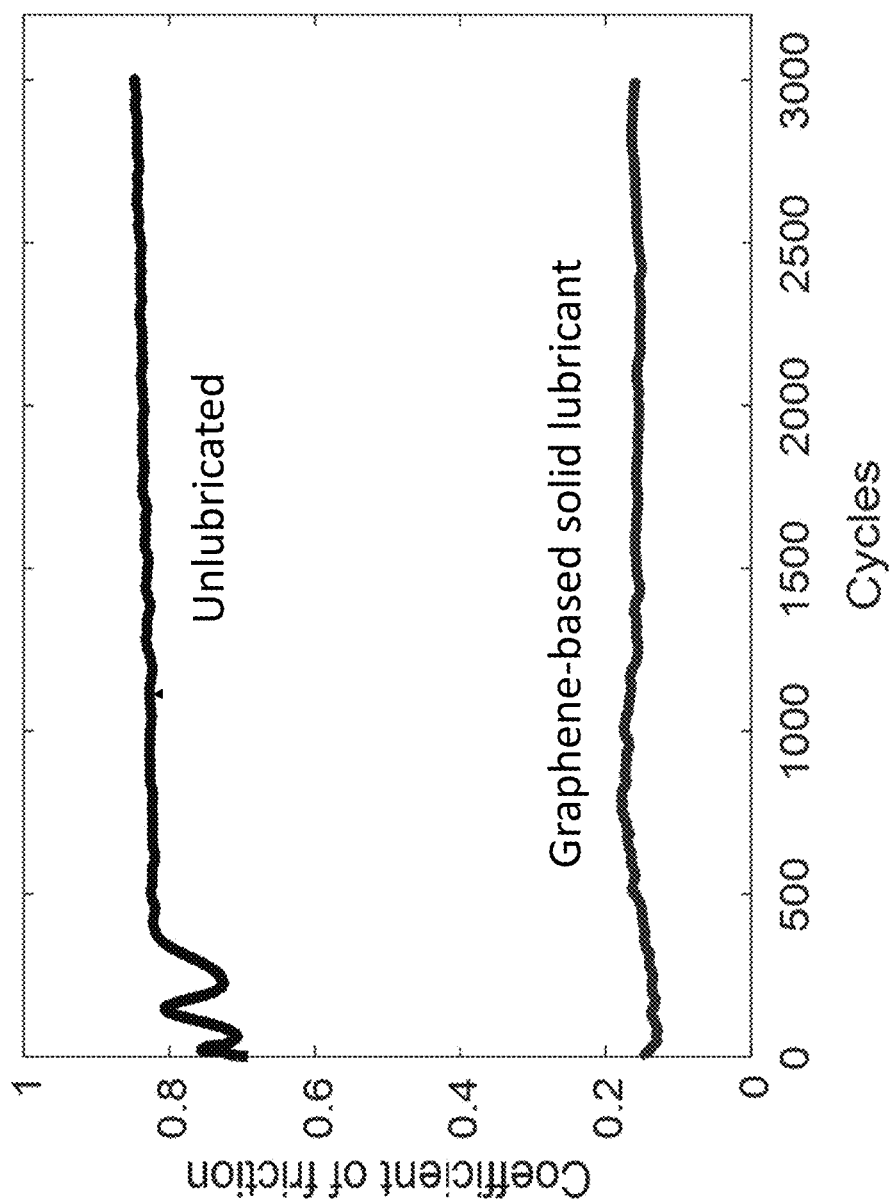
FIG. 14 shows a comparison of the coefficient of friction of a surface obtained by using a composite coating of this disclosure utilizing Aremco-Bond™ 570 product (containing butanone, isopropanol, phenol, carbon black, formaldehyde, and o-cresol) as a binder in the composite coating, and an unlubricated surface.

In further experiments, another binder formulation in place of PDVF was utilized. Aremco-Bond™ 570 polymer-graphene-zinc oxide composite was utilized to increase the adhesion and durability of the coating on contact surfaces and to reduce friction and wear in bearing steels under high contact pressure. The composite was made from graphene, zinc oxide particles, and Aremco-Bond™ 570 polymer as binder. This binder contains butanone, isopropanol, phenol, carbon black, formaldehyde, and o-cresol. The composite coating, with an approximate thickness of 15 µm, was laminated on ASTM 52100 Bearing alloy Steel or also called as Chrome Steel" 52100 bearing steel discs. A sliding wear test with a ball-on-disc configuration was used to measure the tribological performance of the composite coating under a contact pressure of 1 GPa. It was demonstrated that friction and wear on the coated surface were reduced significantly compared to the uncoated surface. The surface adhesion properties of the coating were measured using the Nanovea® scratch tester and compared to an earlier graphene-zinc oxide coating and found improved adhesion. FIG. 14 shows a comparison of the coefficient of friction of a surface obtained by using this composite lubricant utilizing this binder Aremco-Bond 570) containing butanone, isopropanol, phenol, carbon black, formaldehyde, and o-cresol and an unlubricated surface. Referring to FIG. 14, the tribological performance of the solid lubricant-coated surface was superior to that of the uncoated surface. Under a normal load of 4 N and duration of 3000 cycles, the coefficient of friction declined about 82% in the graphene-based coating compared to the uncoated contact. The coefficient of friction in the uncoated surface started at 0.69, and after 500 cycles, rose to the steady state value of 0.84. In contrast, the coefficient of friction in the coated surfaces started at 0.14 and reached the steady state of 0.15, exhibiting more stable behavior during the test.

Figure 15:
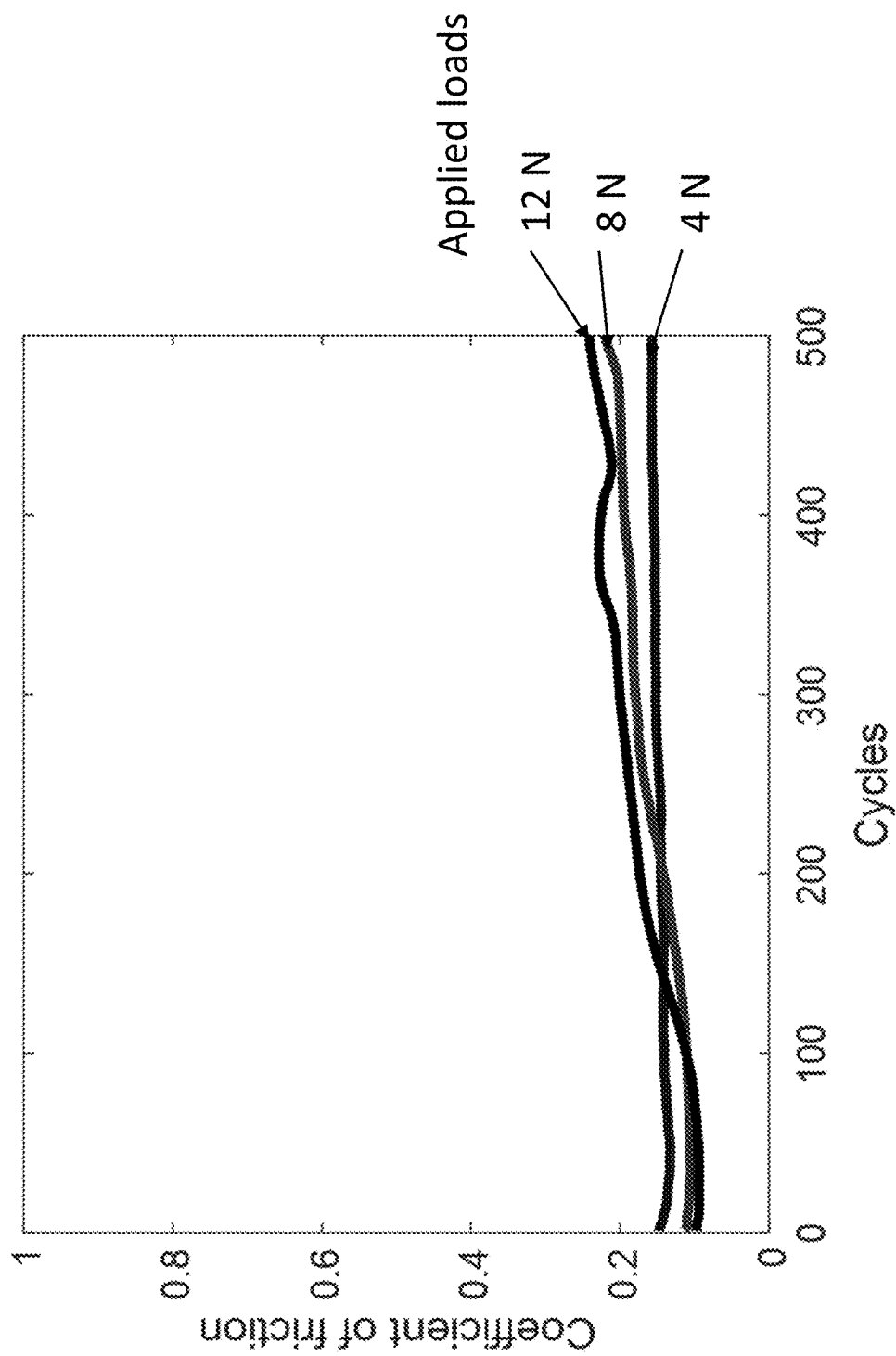
FIG. 15 shows effect of normal load conditions on the coefficient of friction of a surface coated with a composite coating of this disclosure.

To evaluate the influence of normal load on the tribological behavior of the composite coating, the coefficient of friction in three different tests were measured with normal loads of 4, 8, and 12 N corresponding to Hertzian pressures of 1.01, 1.27, and 1.45 GPa, respectively. FIG. 15 shows effect of normal load conditions on the coefficient of friction of a surface coated with a composite coating of this disclosure using a composite coating utilizing Aremco-Bond 570 (containing butanone, isopropanol, phenol, carbon black, formaldehyde, and o-cresol) as the binder in the composite. Referring to FIG. 15, the coefficient of friction remained almost constant for the different loads up to 500 cycles. The 12 N normal force test resulted in faster utilization of the coating such that after 500 cycles, the coefficient of friction started to increase. However, the test with normal force of 8 N lasted longer (more than 1000 cycles). Therefore, it can be concluded that as the amount of load increases, the durability of the coating diminishes due to the higher wear rate at the higher normal load. The consistency of the solid lubricant is related to the native mechanical strength of graphene and the strong adhesive properties of zinc oxide and the binder. The solid lubricant's high-bearing load capacity demonstrates its potential for high-pressure applications.

Thus, in this disclosure, a novel graphene-zinc oxide composite film is created and studied as a solid-state lubricant for friction and wear reduction under extreme load conditions. The liquid-free composite is made from a slurry of graphene, zinc oxide, and polyvinylidene difluoride spin-coated onto a stainless steel substrate. Enhanced tribological performance was measured under ambient conditions using a ball-on-disk tribometer with contact pressures up to 1.02 GPa and sliding distances up to 450 m. The graphene-rich lubricant demonstrates substantial friction reduction and wear loss (approximately 90%) compared to unlubricated sliding. The composite film is able to maintain its lubricating effects under extreme operating conditions including 15 N normal load and 450 m sliding distance. Following tribological testing, optical and spectroscopic analysis of the formed wear tracks reveal a persistent protective film on the ball and disk surfaces. The excellent tribological performance of this graphene-rich composite is attributed to the adhesion effect from zinc oxide: zinc adheres graphene to the contact interface, maintaining improved tribological performance under high contact pressure. The durability and resilience of this adhesive coating suggest exceptional potential as a dry lubricant for high load-bearing applications.

Based on the above detailed description, it is an objective of this disclosure to describe a solid-state lubricant composition comprising graphene, an oxide of a metal, and a polymeric binder In such a solid-state lubricant, the weight percent of graphene can be in the range of 70 to 90, a non-limiting preferred range being 80 to 85. For the solid-state lubricants of this disclosure, the oxide can be an oxide of a metal, such as, but not limited to zinc, tin, molybdenum, silver, copper, lead, indium and antimony. In a preferred composition, the oxide of a metal was zinc oxide with weight percent in the range of 5 to 20, a preferred range being 10 to 15. Further, non-limiting examples suitable for use as the polymeric binder in the solid-state lubricants of this disclosure are polyvinylidene difluoride, and polyethylene oxide, polyvinyl acetate, and polytetrafluoroethylene. In some embodiments of the solid-state lubricant of this disclosure, the polymeric binder comprises butanone, isopropanol, phenol, carbon black, formaldehyde, and o-cresol. A non-limiting range for the weight percent of the polymeric binder in the solid-state lubricants of this disclosure is 2 to 10, with a preferred range being 5 to 8. It should be noted that in the preparation of the lubricant composition an organic solvent is also typically used which later evaporates in processing as described above.

It should be noted that in some embodiments of the solid-lubricant of this disclosure the metal oxide can be replaced by sulfides, nitrides or fluorides of a metal. Examples of such replacements for the metal oxide include, but not limited to Molybdenum Sulfide ($MoS_2$). Tungsten sulfide ($WS_2$), boron nitride and titanium nitride. It should also be further noted that in some embodiments of the solid lubricants of this disclosure, more than one polymeric binder can be incorporated. Thus the solid-lubricants of this disclosure can contain one or more than one polymeric binder.

Based on the above description, it is another objective of this disclosure to describe a method of making a solid-state lubricant coating on a substrate. The method includes the steps of making a homogeneous slurry comprising powder of an oxide of a metal, graphene, and a polymeric binder; coating a substrate with the homogeneous slurry; and drying the slurry on the substrate, resulting in a solid lubricant coating on the substrate. In some embodiments of the method, the homogeneous slurry is made using sonication.

In some embodiments of the method, the coating the substrate is produced by a spin coating process. In some embodiments of the method the substrate is made of stainless steel. It should be recognized that other substrates can be used such as polymers, woods, alloys. The substrate can be a metal, plastic, wood or an alloy. Examples of other metals and alloys that can be used as substrates include, but not limited to, nichrome, Haynes 230 alloy, plastics such as Styrofoam™, low density polyethylene etc. In some embodiments of the method, the polymeric binder is one of polyvinylidene difluoride, polyethylene oxide, polyvinyl acetate. In some embodiments of the method, the polymeric binder contains butanone, isopropanol, phenol, carbon black, formaldehyde, and o-cresol. In some embodiments of the method, the weight percent of the polymeric binder is in the range of 5 to 8. In some embodiments of the method, the metal is one of zinc, tin, molybdenum, lithium, cobalt and antimony but is not limited to these examples. In a preferred embodiments of the method, the metal is zinc.

Based on the above detailed description, it is yet another objective of this disclosure to describe another method of making a solid-state lubricant coating on a substrate. The method includes first making a homogeneous slurry comprising zinc oxide powder, graphene, polyvinylidene difluoride, and an organic solvent. Then, a substrate is coated with the homogeneous slurry. Solvents suitable for this purpose include but not limited to include acetone, ethanol, hexadecane, propanol, N, N-dimethylformamide, N-methyl-2-pyrrolidone, and ethylene glycol. The slurry is then dried on the substrate, resulting in a solid lubricant coating on the substrate. A non-limiting method of making the homogeneous slurry is sonication. Other methods include, but not limited to mixing or stirring. The coating on the substrate can be accomplished by spin coating. Other methods include, but not limited to spray coating and dip coating. In the method, a non-limiting example of a substrate that can be used is stainless steel, which is but one example of contact surfaces wherein it is desired to reduce friction, and for which the solid-lubricants of this disclosure are applicable. Other substrate materials include, but not limited to, other metallic substrates and ceramic substrates. It should be recognized that in this method, more than one polymeric binder can be employed. Likewise, more than one organic solvent can be employed.

The dry solid lubricants of this disclosure find applications in many fields that require reduction of frictional forces. Some areas where the solid lubricants of this disclosure find industrial applications include, but not limited to: molding, including injection molding (for example as release agents); cutting tools; chains; pistons; food packaging industry; railway track joints; machine shop works; locks; open gears; air compressors; gears and oxidizing environments. The solid lubricants of this disclosure are also useful at high temperatures, extreme contact pressures, places where fretting and galling is a problem (e.g. bearings). Thus it is another objective of this disclosure to describe machines and apparatuses that utilize the solid lubricants of this disclosure.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A solid-state lubricant composition comprising:
   graphene,
   an oxide of a metal, and
   a polymeric binder,
   wherein the weight percent of graphene is in the range of 80 to 85.

2. The solid-state lubricant of claim 1, wherein the metal is one of zinc, tin, molybdenum, silver, copper, lead, indium and antimony.

3. The solid-state lubricant of claim 2, wherein the metal is zinc.

4. The solid-state lubricant of claim 3, wherein the weight percent of the oxide of zinc is in the range of 5 to 20.

5. The solid-state lubricant of claim 4, wherein the weight percent of the oxide of zinc is in the range of 10 to 15.

6. The solid-state lubricant of claim 1, wherein the weight percent of the polymeric binder is in the range of 2 to 10.

7. The solid-state lubricant of claim 6, wherein the weight percent of the polymeric binder is in the range of 5 to 8.

8. Solid-state lubricant of claim 1, wherein the polymeric binder is one of polyvinylidene difluoride, polyethylene oxide, polyvinyl acetate, and polytetrafluoroethylene.

* * * * *